United States Patent [19]

Rehfeld

[11] 3,868,888
[45] Mar. 4, 1975

[54] VEHICLE STEERING GEAR ASSEMBLY
[75] Inventor: Frederick L. J. Rehfeld, Saginaw, Mich.
[73] Assignee: General Motors Corporation, Detroit, Mich.
[22] Filed: Nov. 28, 1973
[21] Appl. No.: 419,638

[52] U.S. Cl. ............ 91/375 A, 74/388 PS, 74/499, 91/391 R, 180/79.2 R
[51] Int. Cl. ......................... B62d 5/06, B62d 3/08
[58] Field of Search ............ 91/391 R, 375 A, 380; 74/388 PS, 499, 500; 180/79.2 R

[56] References Cited
UNITED STATES PATENTS

| | | | |
|---|---|---|---|
| 3,022,772 | 2/1962 | Zeigler et al. | 91/380 X |
| 3,121,345 | 2/1964 | Zeigler et al. | 91/375 A X |
| 3,722,369 | 3/1973 | Maekawa et al. | 91/465 X |
| 3,741,074 | 6/1973 | Oxley et al. | 91/375 A |

Primary Examiner—Samuel Scott
Assistant Examiner—John Reep
Attorney, Agent, or Firm—Saul Schwartz

[57] ABSTRACT

A vehicle steering gear assembly of the hydraulic power assist type including a rack piston and a pitman shaft and adapted for torque multiplication in a first range wherein torque multiplication is primarily a function of hydraulic pressure and a second range wherein torque multiplication is purely mechanical. The steering gear assembly further includes a worm shaft having two distinct threads thereon, a first follower between the rack piston and one thread, a second follower between the rack piston and the second thread, and a clutch arrangement between the rack piston and the followers for rigidly connecting an appropriate one of the followers to the rack piston in response to predetermined worm shaft torque magnitude.

8 Claims, 7 Drawing Figures

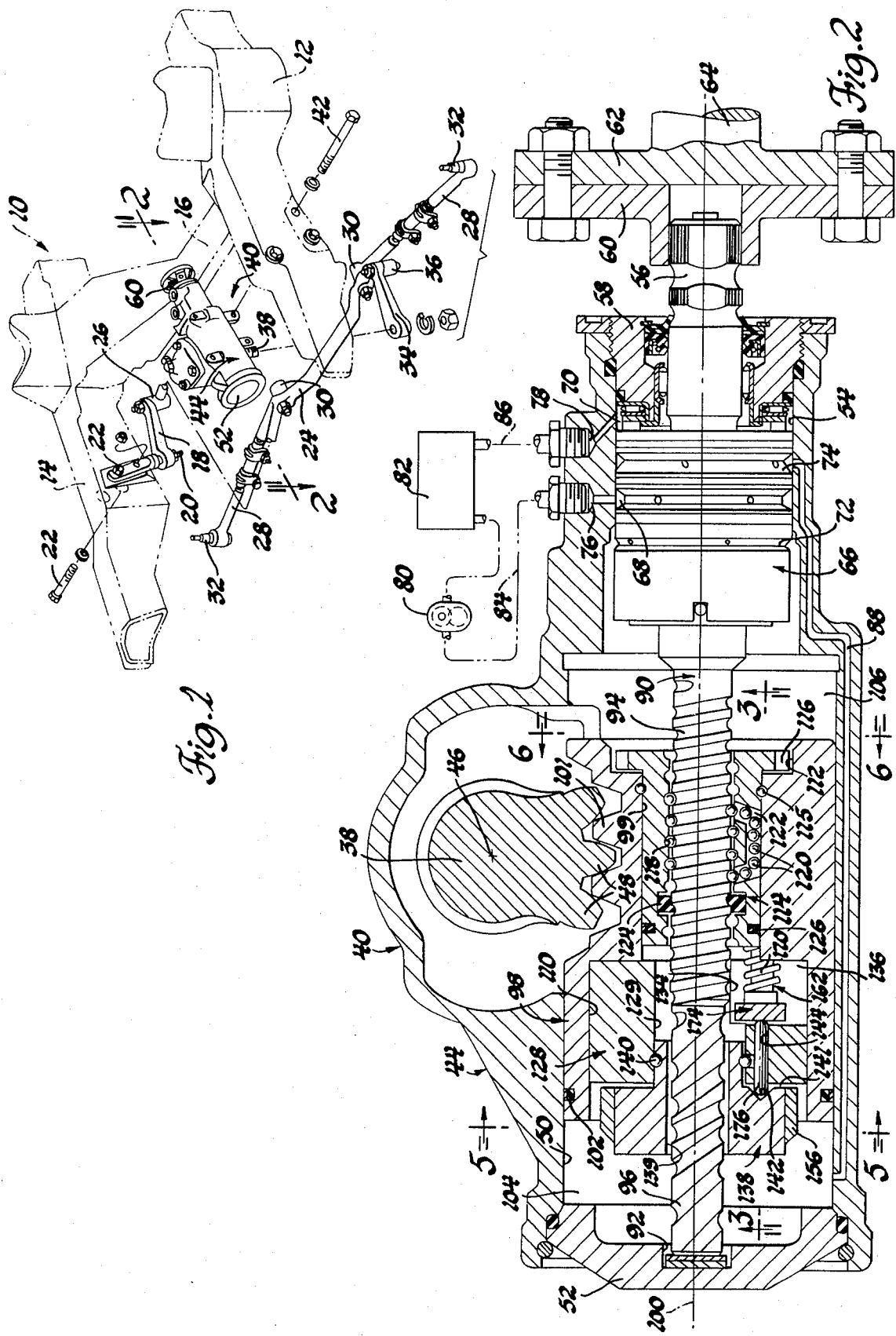

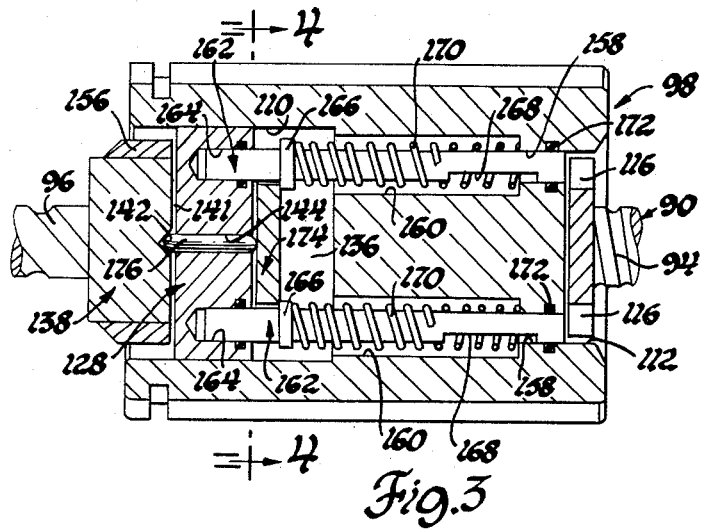
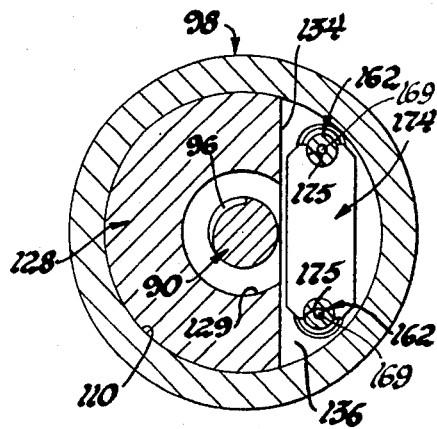
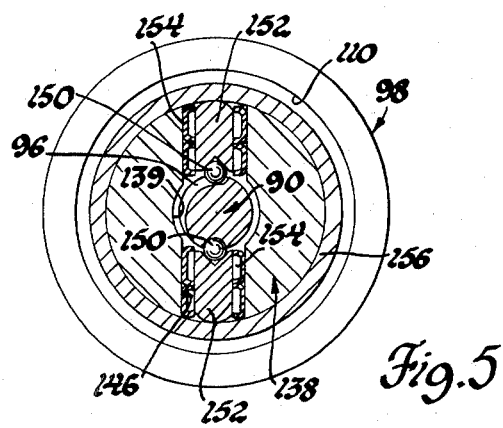
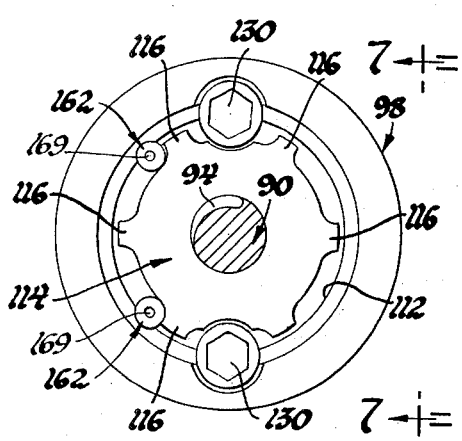
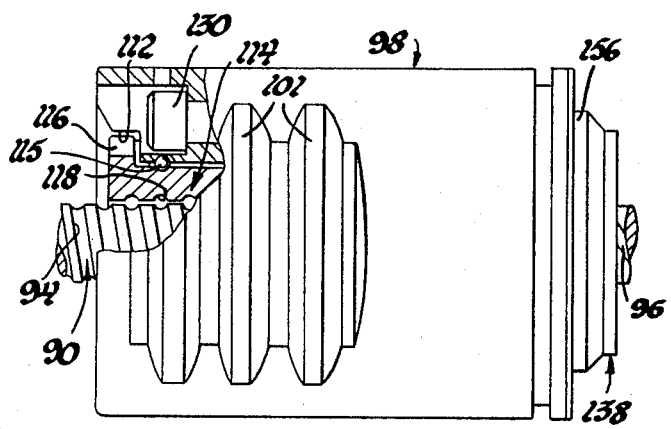

3,868,888

VEHICLE STEERING GEAR ASSEMBLY

This invention relates generally to automotive steering systems and more particularly to a steering gear assembly adapted for torque multiplication in two ranges.

In automobile steering systems, the amount of angular movement of the steering handwheel necessary to effect a particular steering maneuver is a function of, among other things, the torque multiplication ratio of the steering gear assembly. Similarly, the manual effort necessary to turn the steering handwheel is also a function of the steering gear torque multiplication ratio. In a manual steering gear assembly, torque multiplication is effected solely through mechanical means so that as torque multiplication increases the difference between input shaft revolutions and output shaft revolutions also increases. In hydraulic, power assisted type steering assemblies, torque multiplication depends primarily upon hydraulic pressure and, accordingly, it is possible to construct steering gear assemblies with high torque multiplication characteristics but without corresponding large differences between input and output shaft rotations. In this respect, however, the full potential of power assisted steering gear assemblies has not been exploited in conventional automobiles because of the necessity that the vehicle be manually steerable if the power assist becomes inoperative. A steering gear assembly constructed according to this invention represents an improved steering gear structure incorporating a dual range feature which automatically alters the torque multiplication ratio of the assembly in response to the magnitude of the torque applied at the stering handwheel.

The primary feature, then, of this invention is that it provides an improved steering gear assembly particularly adapted for incorporation in an automobile steering system. Another feature of this invention is that it provides an improved steering gear assembly of the power assisted type including a housing, a unitary pitman shaft and sector gear rotatably disposed on the housing, a rack piston slidable in the housing and having teeth engageable on the sector gear for effecting concurrent pivotal movement of the pitman shaft, and a worm shaft extending through the rack piston, the improvement residing in a dual ratio connection between the worm shaft and the rack piston automatically changeable in response to the magnitude of torque applied to the worm shaft. Yet another feature of this invention resides in the provision in the improved steering gear assembly of a dual ratio connection including two separate threads on the worm shaft each of different lead, a pair of followers independently rotatable on the rack piston and threadedly engaging corresponding ones of the worm shaft threads, and a clutch arrangement on the rack piston responsive to worm shaft torque for automatically connecting one or the other of the followers to the rack piston. A further feature of this invention resides in the provision in the improved steering gear assembly of a pressure relief arrangement which, when the steering gear assembly is of the hydraulic power assisted type, relieves the hydraulic pressure within the assembly whenever the torque multiplication ratio of the assembly is increased. These and other features of this invention will be readily apparent from the following specification and from the drawings wherein:

FIG. 1 is a fragmentary perspective view of a typical automobile steering system incorporating an improved steering gear assembly according to this invention;

FIG. 2 is an enlarged sectional view taken generally along the plane indicated by lines 2—2 in FIG. 1;

FIG. 3 is a sectional view taken generally along the plane indicated by lines 3—3 in FIG. 2;

FIG. 4 is a sectional view taken generally along the plane indicated by lines 4—4 in FIG. 3;

FIG. 5 is a sectional view taken generally along the plane indicated by lines 5—5 in FIG. 2;

FIG. 6 is a sectional view taken generally along the plane indicated by lines 6—6 in FIG. 2; and FIG. 7 is a fragmentary partially broken away view taken generally along the plane indicated by lines 7—7 in FIG. 6.

Referring now to FIG. 1 of the drawings, thereshown is the forward portion of a typical automobile chassis frame designated generally 10 including a left side rail 12 and a right side rail 14 interconnected by a cross member 16. The vehicle's steering system includes an idler arm 18 supported on a stud 20 rigidly attached to the frame rail 14, as by bolts 22 for pivotal movement about a generally vertical axis defined by the stud. A drag link 24 is connected to the distal end of the idler arm through a swivel joint 26 and has a pair of tie rod ends 28 connected thereto through a pair of swivel joint 30. Each tie rod end supports a ball stud 32 adapted for rigid attachment to a steering knuckle, not shown, on the corresponding one of the vehicle's steerable road wheels, not shown. Accordingly, as the drag link 24 is shifted transversely with respect to the frame in a path of motion defined, in part, by the idler arm 18, the steering knuckles are caused to pivot about the road wheel steering axes to effect directional control of the vehicle. Bodily shiftable movement of the drag link 24 is effected by a pitman arm 34 attached to the drag link through a swivel joint 36 and rigidly supported on the distal end of the pitman shaft 38 projecting from a steering gear assembly constructed according to this invention and designated generally 40. The steering gear assembly is adapted for rigid attachment to the left frame rail 12 by a plurality of bolts 42 and the pitman arm is adapted for pivotal movement about the longitudinal axis of the pitman shaft as a unit with the latter, the swivel joint 36 functioning to convert pivotal movement of the pitman arm into transverse movement of the drag link.

Referring particularly now to FIG. 2, the steering gear assembly 40 includes a housing 44 which supports the pitman shaft 38 for pivotal movement about an axis 46 of the housing which coincides with the longitudinal axis of the shaft, the pitman shaft having a plurality of integral sector gear teeth 48 formed thereon within the housing. The housing 44 defines a primary cylindrical bore 50 closed at one end by a cap 52 rigidly attached to the housing and a secondary cylindrical bore 54 smaller in diameter than the primary bore. An input shaft 56 is rotatably supported in a sealed plug 58 which closes the outboard end of the secondary bore 54. A flange 60 is rigidly attached to a knurled end portion of the input shaft 56 and defines one-half of a flexible coupling, the other half of the flexible coupling being defined by a second flange 62 rigidly attached to a steering shaft 64 and to the flange 60. The steering shaft 64 is rotatably supported in a steering column assembly, not shown, and has attached at its distal end a conventional steering handwheel. The steering shaft functions to transfer torque manually applied at the steering handwheel to the input shaft 56 of the steering gear assembly.

Referring again to FIG. 2, a fluid directing valve assembly 66 is rotatably disposed in the secondary bore 54 and defines a ported inlet annulus 68, an exhaust area 70, and a pair of ported annuli 72 and 74. An inlet port 76 in the housing 44 communicates with the inlet annulus 68 and an exhaust port 78 in the housing communicates with the exhaust area 70. An engine or otherwise continuously driven pump 80 supplies hydraulic fluid from a reservoir 82 through appropriate hydraulic lines 84 to the inlet annulus 68 through the port 76. Another hydraulic line 86 connects the reservoir and exhaust port for transferring hydraulic fluid from the exhaust area to the reservoir.

The ported annulus 72 is in direct communication with the portion of the interior of the housing adjacent the valve assembly while the ported annulus 74 is in communication with the portion of the interior of the housing adjacent the cap 52 through a passage 88. The valve assembly 66 functions to control the distribution of hydraulic fluid under pressure from the inlet annulus 68 in response to torque applied at the input shaft 56. Accordingly, when torque is applied to the input shaft in one direction, fluid under pressure is supplied to the housing through one of the ported annuli 72 and 74 and exhausted from the housing through the other of the ported annuli and vice versa. For a full and complete description of the valve assembly 66, reference may be made to U.S. Pat. No. 3,022,772, issued to P. B. Zeigler et al. and assigned to the assignee of this invention.

As seen best in FIGS. 2, 3 and 7, the steering gear assembly 40 further includes a worm shaft 90 operatively connected at one end to the valve assembly 66, the distal end of the worm shaft projecting into a shallow counterbore 92 in the cap 52. The worm shaft 90 has formed thereon a first constant lead thread 94 and a second variable lead thread 96 having a lead substantially exceeding that of the first thread. A rack piston 98 having an internal cylindrical bore 99 therethrough is slidably disposed in the primary cylindrical bore 50 of the housing around the worm shaft for bodily shiftable movement along an axis 100 of the housing which coincides with the longitudinal axis of the worm shaft 90. The rack piston includes a plurality of rack teeth 101 adapted for meshing engagement with the sector gear teeth 48 on the pitman shaft 38 so that bodily shiftable movement of the piston effects concurrent rotation of the pitman shaft about the axis 46. A seal 102 supported on the rack piston divides the interior of the housing into a pair of pressure chambers 104 and 106, the chamber 104 being in communication with the ported annulus 74 through the passage 88 and the chamber 106 being in direct communication with the ported annulus 72.

As seen best in FIG. 2, the bore 99 through the rack piston communicates at one end with an enlarged cylindrical counterbore 110 and at the opposite end with a smaller cylindrical counterbore 112. A ball nut 114 is rotatably disposed in the bore 99 of the rack piston and restrained longitudinally by a plurality of rolling elements 115 disposed in registered annular grooves in the nut and the rack piston. The ball nut includes an integral flanged head disposed in the counterbore 112 defining a plurality of angularly spaced locking tangs 116, FIG. 6. The ball nut 114 further includes an internal thread 118 complementary to the thread 94 on the worm shaft. A plurality of anti-friction balls 120 are disposed between the thread 118 and the thread 94 and recirculate in a well known manner through a guide 122 in the ball nut. A seal 124 is disposed between the ball nut 114 and the worm shaft 90 and a seal 126 is disposed between the ball nut and the rack piston.

Referring to FIGS. 2, 3 and 4, a cylindrical support member 128 having a central bore 129 therethrough is disposed within the counterbore 110 of the rack piston 98 around the worm shaft and is rigidly attached to the rack piston by a pair of cap screws 130 projecting from the opposite side of the rack piston, the head of each of the cap screws being disposed inboard of the plane of the tangs 116, FIGS. 6 and 7, so as not to interfere with the latter. The support member 128 includes a milled flat 134, FIG. 4, which cooperates with the counterbore 110 in defining a recess 136 within the rack piston.

As seen best in FIGS. 2, 3 and 5, a follower support 138 having a central bore 139 therethrough is rotatably journaled on the support member 128 around the worm shaft and within the bore 129 by a plurality of rolling elements 140, the rolling elements 140 also functioning to restrain the follower support longitudinally relative to the support member 128. The follower support 138 includes an annular shoulder 141 having a detent notch 142 therein adapted for registry with a bore 144 through the support member 128 in one angular position of the follower support relative to the support member.

Referring particularly now to FIG. 5, the follower support 138 further includes a cross bore 146 communicating between the central bore 139 and the outside diameter of the follower support. A pair of anti-friction ball followers 150 are disposed in the variable lead thread 96 on the worm shaft and are maintained in the thread by a pair of sockets 152 rotatably supported in the cross bore 146 on opposite sides of the worm shaft 90 by a plurality of needle bearings 154. The sockets are maintained within the cross bore 146 by a band 156 pressed around the outside diameter of the follower support 138.

As seen best in FIGS. 2, 3, 4 and 6, the rack piston further includes a pair of relatively short parallel pin bores 158 which communicate at one end with the counterbore 112 and at the other end with respective ones of a pair of counterbores 160 in the rack piston, the counterbores opening into the recess 136 defined by the support member 128. Respective ones of a pair of lock pins 162 are slidably disposed in corresponding ones of the pin bores 158 and in a corresponding pair of bearing bores 164 in the support member 128, FIG. 3, each lock pin including an annular shoulder 166, a notch 168, and an axial pressure balancing bore 169. Respective ones of a pair of coil springs 170 are disposed around corresponding ones of the lock pins 162 and seat at one end against the base of the corresponding one of the counterbores 160 and at the other end against the corresponding one of the shoulders 166. The springs 170 resiliently bias the lock pins 162 rightwardly to a retracted position, FIG. 3, wherein the leftward end of each lock pin is disposed inboard of the plane of the tangs 116. A seal 172 is disposed between each of the lock pins and the rack piston.

Referring again to FIGS. 2, 3 and 4, an actuating lever 174 defining a notch 175 at each end is disposed between the lock pins 162 within the recess 136. The notches 175 engage corresponding ones of the lock pins on the opposite side of each of the shoulders 166 from the springs 170. The springs bias the lock pins and, consequently, the actuating lever 174 rightwardly into engagement on one end of an actuating pin 176 slidably disposed within the bore 144 in the support member 128. The actuating pin, in turn, is biased toward a detenting position, FIG. 3, wherein the pin projects into the detent notch 142 in the follower support 138 thereby to couple together the support member 128 and the follower support 138 for preventing rotation of the follower support relative to the rack piston.

Referring now to FIGS. 1, 2 and 5 and describing the operation of the steering gear assembly 40, under normal operating conditions the structural elements of the steering gear assembly 40 assume the relative positions shown in FIGS. 2 and 3 with the lock pins 162 disposed in their retracted positions and the actuating pin 176 disposed in the detenting position so that the ball nut 114 is free to rotate or freewheel relative to the rack piston while the follower support 138 is restrained against such relative rotation by the actuating pin. Under typical straight ahead driving conditions, the followers 150 are disposed at the center of the variable lead thread 96. When a change in vehicle direction is required, the operator turns the steering handwheel to apply input torque at the input shaft 56 for urging rotation of the latter shaft in the appropriate direction.

As is clearly shown and explained in the aforementioned Zeigler patent, the input shaft 56 is directly coupled to the worm shaft 90 through a torsion rod within the valve assembly 66 so that the worm shaft is simultaneously urged to rotate in the direction of the input shaft. The pitman shaft 38, however, resists rotation of the worm shaft by holding the rack piston against bodily movement through interaction of the teeth 48 and 101. Thus, the torsion rod in the valve assembly 66 twists to permit actuation of the valve assembly for supplying fluid under pressure to the appropriate one of the chambers 104 and 106 which fluid pressure effects bodily movement of the rack piston and concurrent rotation of the pitman shaft 38, the steering gear assembly thus multiplying steering handwheel torque in a first range.

As the rack piston begins to move, the followers 150 under the urging of the torsion rod, traverse the length of the thread. As long as the followers 150 remain generally in the center of the thread 96 where the lead is substantially constant, the amount of angular deflection of the torsion rod remains substantially constant and hence the flow rate of pressurized fluid to the appropriate one of the chambers 104 and 106 remains substantially constant. When the followers reach the rapidly increasing lead portion of the thread 96, however, an increased resistance to rotation of the worm shaft is developed and the torsion rod, accordingly, is twisted even further. The increased twist of the torsion rod causes the valve assembly 66 to increase the flow rate of pressurized fluid so that the rack piston moves faster as the steerable wheels are turned further from their straight ahead position. This variable lead feature functions to maintain moderate steering responses near the straight ahead position of the steerable wheels where most average or high speed driving is done while permitting faster response for large wheel excursions which typically occur in parking situations.

If, for one reason or another, the value assembly does not receive fluid under pressure, the torque multiplication provided by the pressurized fluid cannot be achieved. Under these circumstances, when the input shaft is initially rotated the torsion rod is immediately twisted to a limit position wherein a direct couple is effected between the input shaft on the worm shaft so that steering handwheel torque is applied directly at the worm shaft. The follower support 138, held stationary relative to the rack piston 98 by the actuating pin 176 and the rolling elements 140, functions as a nut on the variable lead thread so that the worm shaft torque urges bodily shiftable movement of the rack piston in the appropriate direction along the axis 100 for pivoting the pitman shaft. Simultaneously, a force reaction is developed between the sides of the detent notch 142 and the end of the actuating pin 176 urging the latter leftwardly, FIG. 3, out of the notch. This force reaction is resisted through the actuating lever 174 by the springs 170 which bias the actuating pin to the detenting position.

The springs 170 are calibrated to hold the actuating pin in the detenting position until a force of predetermined magnitude in the opposite direction is developed. The predetermined magnitude corresponds to a worm shaft torque magnitude exceeding the magnitudes encountered during normal power assisted operation but substantially less than the magnitude required to move the rack piston without power assist. Therefore, when the operator applies a torque to the steering handwheel without power assist, the worm shaft torque rapidly increases to a magnitude sufficient to effect movement of the actuating pin 176 against the springs 170 from the detenting position, FIGS. 2 and 3, to a releasing position, not shown, out of engagement with the detent notch 142. With the actuating pin in the releasing position, the follower support 138 is free to rotate or freewheel relative to the rack piston.

Referring to FIGS. 2 and 3, as the actuating pin 176 is shifted leftwardly toward the releasing position, the actuating lever 174 is simultaneously moved leftwardly. The actuating lever bears against the annular shoulder 166 on each lock pin 162 thereby to shift the lock pins leftwardly against the action of the springs 170. When the actuating pin achieves the releasing position, the distal end of each of the lock pins projects into the plane of the locking tangs 116 for engagement on the latter to thereby lock the ball nut 114 against rotation relative to the rack piston. With the ball nut thus locked against relative rotation, input shaft torque applied directly at the worm shaft is reacted through the anti-friction balls 120 so that a force directed parallel to the axis 100 is developed on the rack piston. The thread 94 has a relatively low lead so that the force developed on the rack piston is substantial in magnitude and sufficient to effect pivotal movement of pitman shaft 38 through the teeth 48 and 101. The lead of thread 94 is predetermined to maintain the steering handwheel effort at an acceptable level. Of course, as long as the ball nut 114 is locked against rotation relative to the rack piston, the follower support 138 freewheels relative to the rack piston with the actuating pin 176 returning to the detenting position each time registry occurs between the pin and the detent notch 142.

However, as long as the power assist system is nonoperative, the actuating pin is immediately returned to the releasing position as described hereinbefore thereby to again lock the ball nut 114 against rotation relative to the rack piston so that steering handwheel torque is multiplied in a second, purely mechanical range.

As seen best in FIG. 6, the angular spacing between the locking tangs 116 is predetermined to insure that at no time will both lock pins 162 be aligned with respective ones of the locking tangs. In the event that one of the lock pins 162 is aligned with one of the locking tangs 116 as the actuating pin shifts to the releasing position, movement of that lock pin to the extended position is prevented. In this situation, however, the lever 174 functions to project the other of the lock pins 162 from the retracted to the extended position faster than would be the case if movement of both pins was unobstructed. Therefore, under no circumstances will the situation exist where both lock pins are simultaneously prevented from achieving the extended position.

Referring particularly to FIGS. 1 and 3, it is desirable to provide pressure relief for each chamber 104 and 106 when the ball nut 114 effects torque multiplication between the input shaft 56 and the pitman shaft 38. For example, if a steerable wheel is blocked against a curb and the pump 80 is functioning normally, the resisting force applied at the rack piston by the pitman shaft is sufficient to cause the valve assembly to supply fluid at maximum pressure to one of the chambers 104 and 106 if an attempt is made to turn the steerable wheels further into the curb. If this pressure is still not sufficient to rotate the pitman shaft and still more torque is applied at the steering handwheel, the ball nut 114 will be locked against rotation relative to the rack piston as described hereinbefore to still further multiply the torque between the input shaft 56 and the pitman shaft 38 to the point where steering linkage distortion could occur.

To positively avoid this situation, the notches 168 in the lock pins 162 define relief passages between the chambers 104 and 106 when either of the lock pins achieves the extended position. More particularly, the seals 102, 124, 126 and 172 cooperate in separating the chambers 104 and 106 with respect to fluid leakage therebetween. When either of the lock pins 162, however, achieves the extended position thereof, the notch 168 thereon provides a passage around the corresponding one of the seals 172 between the counterbore 112 and the counterbore 160. Since counterbore 112 communicates with chamber 106 and counterbore 160 communicates with chamber 104, the fluid pressure in either chamber is prevented from achieving maximum magnitude when either lock pin is in the extended position.

Having thus described the invention, what is claimed is:

1. In a vehicle steering gear of the type including a housing, an input shaft disposed on said housing for rotation about a first axis of the latter, a pitman shaft disposed on said housing for rotation about a second axis of the latter, a sector gear rigidly disposed on said pitman shaft and defining a plurality of teeth, and a rack member disposed on said housing for bodily shiftable movement along said first axis and defining a plurality of rack teeth engageable on said sector teeth for effecting rotation of said pitman shaft in response to bodily shiftable movement of said rack member, the combination comprising, a worm shaft disposed on said housing for rotation as a unit with said input shaft about said first axis, means on said worm shaft defining a first thread of predetermined lead, means on said worm shaft defining a second thread of predetermined lead less than said first thread lead, a first follower threadedly engaging said first thread, a second follower threadedly engaging said second thread, clutch means disposed on said rack member between said first and said second followers and actuateable between a first range condition connecting said first follower and said rack member and a second range condition connecting said second follower and said rack member, and control means associated with said clutch means responsive to the magnitude of torque experienced by said input shaft for actuating said clutch means between said first range and said second range conditions when said input shaft torque exceeds a predetermined minimum magnitude.

2. The combination recited in claim 1 wherein said first thread embodies a variable lead.

3. In a vehicle steering gear assembly of the hydraulic power assist type including a housing, an input shaft disposed on said housing for rotation about a first axis of the latter, a pitman shaft disposed on said housing for rotation about a second axis of the latter, a sector gear rigidly disposed on said pitman shaft and defining a plurality of teeth, a rack member disposed on said housing for bodily shiftable movement along said axis and defining an pair of pressure surfaces and a plurality of rack teeth adapted for meshing engagement on said sector gear teeth thereby to effect rotation of said pitman shaft in response to bodily movement of said rack member, and valve means associated with said input shaft and responsive to the torque experienced thereby for directing pressurized fluid against respective ones of said pressure surfaces, the combination comprising, a worm shaft disposed on said housing for rotation as a unit with said input shaft about said first axis, means on said worm shaft defining a first thread of predetermined lead, means on said worm shaft defining a second thread of predetermined lead less than said first thread lead, a first follower threadedly engaging said first thread, a second follower threadedly engaging said second thread, clutch means disposed on said rack member between said first and said second followers and actuateable between a first range condition connecting said first follower and said rack member and a second range condition connecting said second follower and said rack member, control means associated with said clutch means responsive to the magnitude of torque experienced by said input shaft for actuating said clutch means between said first range and said second range conditions when said input shaft torque exceeds a predetermined minimum magnitude, and fluid pressure by-pass means associated with said clutch means and responsive to the condition of the latter for defining a fluid flow path between said pressure surfaces when said clutch means is in said range condition thereby to reduce the fluid pressure on said pressure surfaces whenever said clutch means is in said second range condition.

4. The combination recited in claim 3 wherein said first thread embodies a variable lead.

5. In a vehicle steering gear assembly of the hydraulic power assist type including a housing, an input shaft disposed on said housing for rotation about a first axis of the latter, a pitman shaft disposed on said housing for rotation about a second axis of the latter, a sector gear rigidly disposed on said pitman shaft and defining a plurality of teeth, a rack member disposed on said housing for bodily shiftable movement along said axis and defining a pair of pressure surfaces and a plurality of rack teeth adapted for meshing engagement on said sector gear teeth thereby to effect rotation of said pitman shaft in response to bodily movement of said rack member, and valve means associated with said input shaft and responsive to the torque experienced thereby for directing pressurized fluid against respective ones of said pressure surfaces, the combination comprising, a worm shaft disposed on said housing for rotation as a unit with said input shaft about said first axis, means on said worm shaft defining a first thread of predetermined lead, means on said worm shaft defining a second thread of predetermined lead less than said first thread lead, a first follower threadedly engaging said first thread, a second follower threadedly engaging said second thread, detent means disposed between said first follower and said rack member for movement between a normal detenting position connecting said first follower and said rack member and being actuateable by said first follower in response to input shaft torque exceeding a predetermined minimum magnitude to a releasing position wherein said rack member is disconnected from said first follower, a lock pin disposed on said rack member for bodily shiftable movement between an extended position engaging said second follower for connecting the latter to said rack member and a retracted position remote from said second follower, spring means disposed between said rack member and said lock pin urging the latter toward the retracted position, and an actuating lever disposed on said rack member between said lock pin and said detent means, said actuating lever being operative to effect bodily shiftable movement of said pin from the retracted to the extended position thereof in response to actuation of said detent means to the releasing position thereof.

6. The combination recited in claim 5 wherein said first thread embodies a variable lead and said lock pin includes a longitudinal slot which in the extended position of said lock pin completes a fluid flow passage between said pressure surfaces.

7. In a vehicle steering gear of the hydraulic power assist type including a housing, an input shaft disposed on said housing for rotation about a first axis of the latter, a pitman shaft disposed on said housing for rotation about a second axis of the latter, a sector gear rigidly disposed on said pitman shaft and defining a plurality of teeth, a rack piston disposed on said housing for bodily shiftable movement along said axis and defining a pair of pressure surfaces and a plurality of rack teeth adapted for meshing engagement on said sector gear teeth thereby to effect rotation of said pitman shaft in response to bodily movement of said rack piston, and valve means associated with said input shaft and responsive to the torque experienced thereby for directing pressurized fluid against respective ones of said pressure surfaces, the combination comprising, a worm shaft disposed on said housing for unitary rotation with said input shaft about said first axis, means on said worm shaft defining a first thread having a variable lead, a first nut member disposed on said rack piston for rotation relative thereto about said first axis and threadedly engaging said first thread, means on said first nut member defining a detent notch, an actuating pin, means supporting said actuating pin on said rack piston for bodily movement between a detenting position disposed in said detent notch and a releasing position remote from said detent notch, said actuating pin in the detenting position thereof connecting said rack piston and said first nut member so that rotation of said worm shaft effects bodily shiftable movement of said rack piston and said detent notch being operative to shift said detent pin to the releasing position in response to torque on said input shaft exceeding a predetermined minimum magnitude, means on said worm shaft defining a second thread having a constant lead less than the lead of said first thread, a second nut member disposed on said rack piston for rotation relative thereto about said first axis and threadedly engaging said second thread, means on said second nut defining a plurality of angularly spaced locking tangs disposed in a plane perpendicular to said first axis, a pair of lock pins disposed on said rack piston in predeterminedly spaced relation for bodily movement parallel to said first axis between extended positions intersecting the plane of said locking tangs thereby to engage respective ones of said locking tangs for preventing rotation of said second nut member relative to said rack piston and retracted positions remote from said locking tangs, spring means urging each of said lock pins toward the retracted position thereof, and an actuating lever engaging each of said lock pins and said actuating pin so that movement of said actuating pin to the releasing position effects concurrent movement of said lock pins to the extended positions thereof, said spring means through said lock pins and said actuating lever biasing said actuating pin toward the detenting position thereof.

8. The combination recited in claim 7 further including a notch on each of said lock pins operative to define a fluid flow path between said pressure surfaces when either of said lock pins is in the extended position thereof.

* * * * *